(12) United States Patent
Thebarge

(10) Patent No.: US 12,420,308 B2
(45) Date of Patent: Sep. 23, 2025

(54) SPRAY RIG FOR LINING AN INTERIOR SURFACE OF A PIPE

(71) Applicant: Michels Corporation, Brownsville, WI (US)

(72) Inventor: Albert Thebarge, Watertown, CT (US)

(73) Assignee: Michels Corporation, Brownsville, WI (US)

( * ) Notice: Subject to any disclaimer, the term of this patent is extended or adjusted under 35 U.S.C. 154(b) by 479 days.

(21) Appl. No.: 18/146,705

(22) Filed: Dec. 27, 2022

(65) Prior Publication Data

US 2024/0207894 A1   Jun. 27, 2024

(51) Int. Cl.
*B05D 7/22* (2006.01)
*B05B 13/06* (2006.01)
*B05B 15/20* (2018.01)

(52) U.S. Cl.
CPC .......... *B05D 7/225* (2013.01); *B05B 13/0627* (2013.01); *B05B 15/20* (2018.02); *B05D 2254/04* (2013.01)

(58) Field of Classification Search
CPC .... B05D 7/225; B05D 2254/04; B05B 15/20; B05B 13/0627
See application file for complete search history.

(56) References Cited

U.S. PATENT DOCUMENTS

| | | | |
|---|---|---|---|
| 5,895,688 A | 4/1999 | Bertoncini et al. | |
| 7,347,896 B2 | 3/2008 | Harrison | |
| 8,186,106 B2 | 5/2012 | Schumacher et al. | |
| 8,512,468 B2 | 8/2013 | Allouche et al. | |
| 10,052,666 B1 * | 8/2018 | Cochran | B01F 23/235 |
| 10,913,177 B2 | 2/2021 | Mallory et al. | |
| 11,827,557 B1 * | 11/2023 | Shaik | B01J 37/0236 |
| 2018/0328527 A1 * | 11/2018 | Weisenberg | B05C 11/1005 |

FOREIGN PATENT DOCUMENTS

| | | |
|---|---|---|
| EP | 506421 A1 | 3/1992 |
| WO | 1995/025702 A1 | 9/1995 |
| WO | 2001/017924 A1 | 3/2001 |
| WO | 2006/074739 A1 | 7/2006 |
| WO | 2010/105049 A2 | 9/2010 |

OTHER PUBLICATIONS

Critica Infrastructure, "Repairing Infrastructure with Geopolymers," <https://www.cs-nri.com/brands/geotree-solutions/geotree-industries-and-markets/repairing-infrastructure-with-geopolymers/?gclid=EAlalQobChMI2PyP35fo-glVqMqUCR0VIwZNEAAYASAAEgLx9PD_BwE> webpage published on 2022.

* cited by examiner

*Primary Examiner* — Xiao S Zhao
(74) *Attorney, Agent, or Firm* — Michael Best & Friedrich LLP

(57) ABSTRACT

A spray rig for lining an interior surface of a pipe with a material. The spray rig includes a base, a motor, and a spray head. The spray head includes a mating component, a mixing chamber, a feed tube, an agitator, and a spray deflector. The mating component removably couples the spray head to the motor. The mixing chamber extends from the mating component and includes a plurality of slots. The feed tube extends from the mixing chamber and is configured to deliver the material to the mixing chamber. The motor is operable to rotate the agitator about an agitator axis to mix the material and to direct the material through the plurality of slots. The spray deflector is coupled to the agitator for rotation with the agitator and is configured to redirect the material from the mixing chamber and onto the interior surface of the pipe.

19 Claims, 10 Drawing Sheets

SPRAY RIG FOR LINING AN INTERIOR SURFACE OF A PIPE

FIELD OF THE INVENTION

The present invention relates to spray rigs, and more specifically, to spray rigs for lining interior surfaces of pipes and/or for use in geopolymer applications.

BACKGROUND

Over time, piping systems may undergo fractures and cracking. For generally larger piping system, spray rigs may be used to travel through, and repair said piping systems. Specifically, the spray rigs may be configured to line an interior surface of the piping system with a lining material to rehabilitate the interior surface of the piping system.

SUMMARY

In one aspect, the disclosure provides a spray rig for applying a material to a pipe to line an interior surface of the pipe with the material. The spray rig includes a base, a motor, and a spray head. The base is configured to move over an interior surface of the pipe. The motor is mounted to the base for movement with the base along the interior surface of the pipe. The spray head includes a first end, a second end, a mating component, a mixing chamber, a feed tube, an agitator, and a spray deflector. The second end is opposite the first end. The mating component is adjacent to the first end of the spray head and the mating component removably couples the spray head to the motor. The mixing chamber extends from the mating component and the mixing chamber includes an internal cavity and a plurality of slots in fluid communication with the internal cavity. The feed tube extends from the mixing chamber and is in fluid communication with the internal cavity. The feed tube is configured to deliver the material to the internal cavity. The agitator is in the mixing chamber. The agitator is coupled to the motor and the motor is operable to rotate the agitator about an agitator axis to mix the material in the mixing chamber and to direct the material through the plurality of slots. The spray deflector is adjacent the second end of the spray head. The spray deflector is coupled to the agitator for rotation with the agitator by the motor. The spray deflector is configured to redirect the material from the mixing chamber and onto the interior surface of the pipe.

In another aspect, the disclosure provides a method of applying a material to a pipe to line an interior surface of the pipe with the material. The method includes providing a spray rig within the pipe, supply a cementitious rehabilitating material and a quick setting additive to the spray rig, actuating the spray rig, and spraying the material onto the interior surface of the pipe. The spray rig includes a base, a motor, and a spray head. The base is configured to move over an interior surface of the pipe. The motor is mounted to the base for movement with the base along the interior surface of the pipe. The spray head includes a mating component, a mixing chamber, a feed tube, and an agitator. The mating component removably couples the spray head to the motor. The mixing chamber extends from the mating component and includes an internal cavity and a plurality of slots in fluid communication with the interior cavity. The feed tube extends from the mixing chamber and is in fluid communication with the internal cavity. The agitator is coupled to the motor such that the motor is operable to rotate the agitator about an agitator axis. Supply the cementitious rehabilitating material and the quick setting additive includes supplying the cementitious rehabilitating material and the quick setting additive to the feed tube such that the cementitious rehabilitating material and the quick setting additive are delivered to the internal cavity of the mixing chamber through the feed tube. Actuating the motor includes actuating the motor to drive rotation of the agitator for mixing the cementitious rehabilitating material and the quick setting additive to form the material within the mixing chamber such that the material is a mixture of the cementitious rehabilitating material and the quick setting additive.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
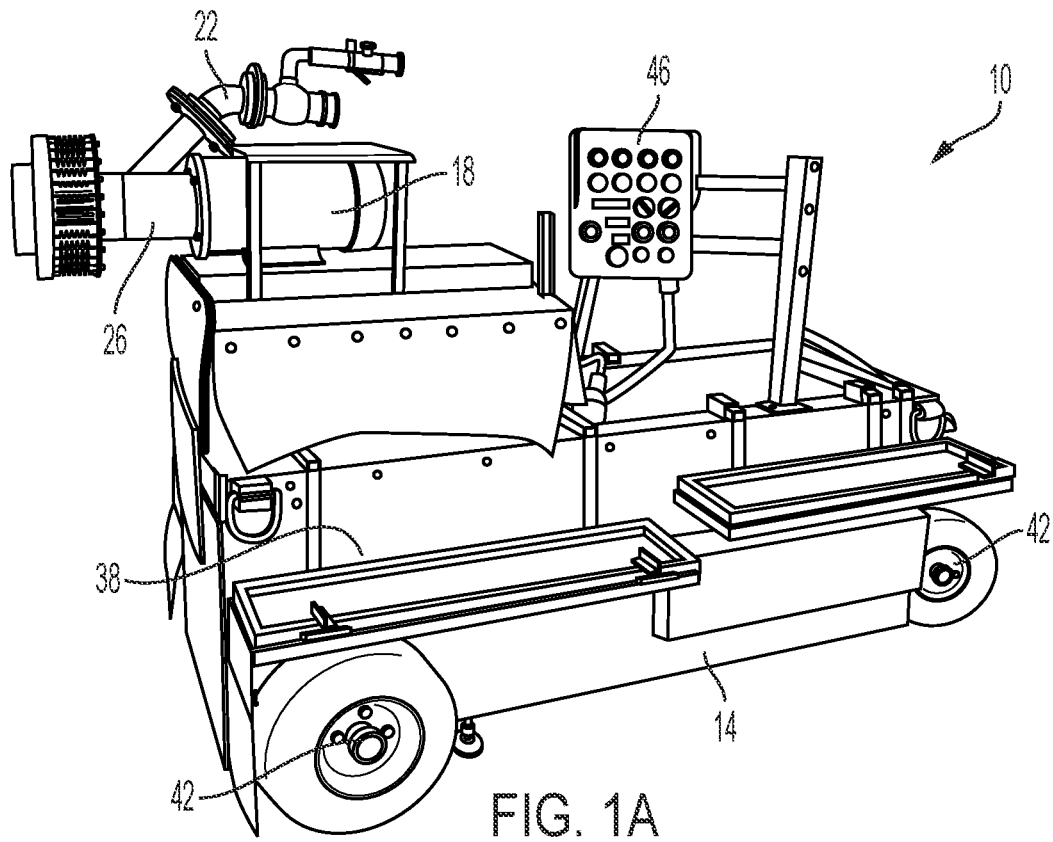
FIG. 1A is a perspective view of a spray rig including a base, a motor, a supply tube, and a spray head according to an embodiment of the disclosure.
Figure 2:
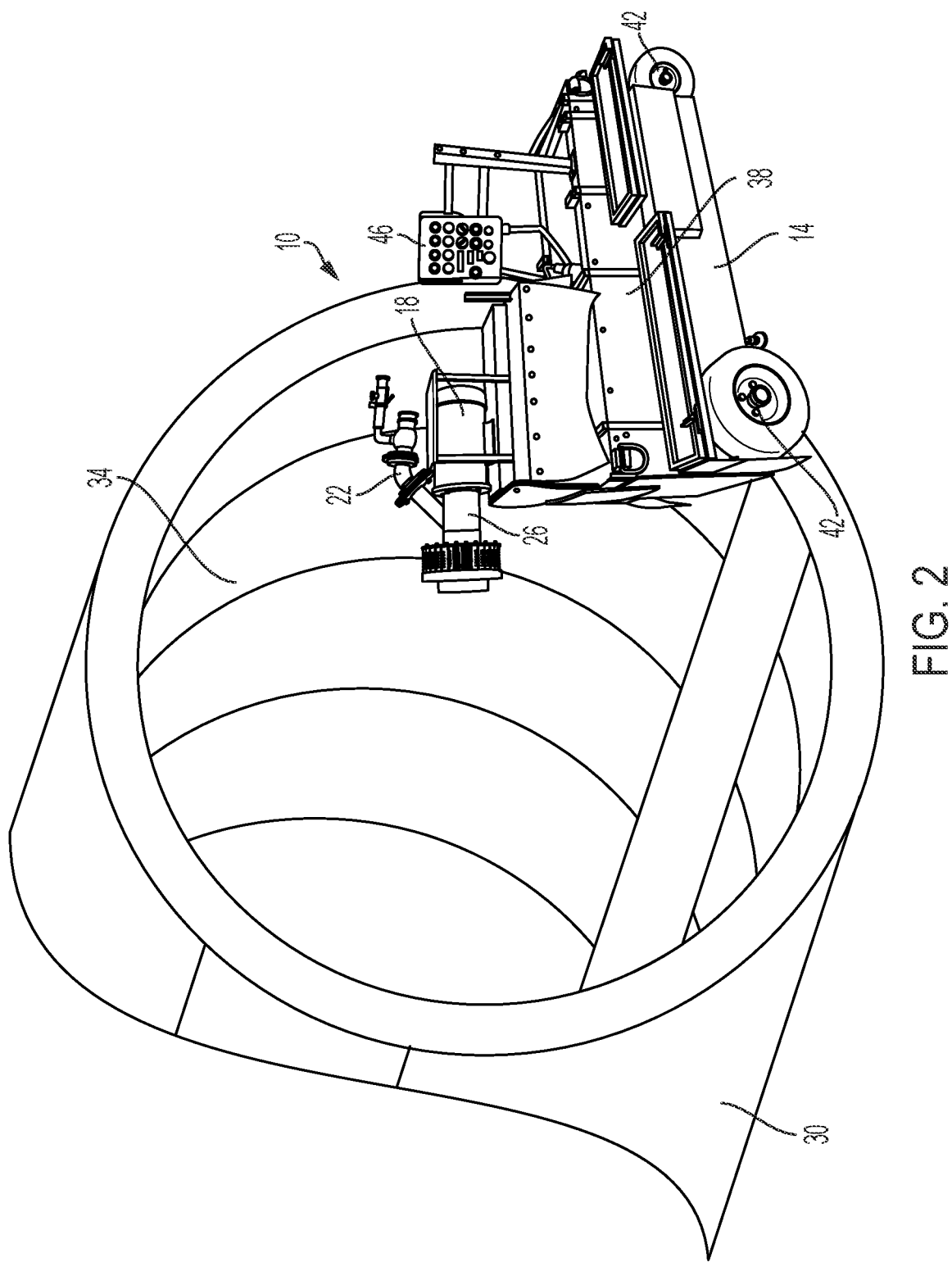
FIG. 2 is a perspective view of the spray rig of FIG. 1A positioned to enter a pipe.

FIGS. 1A and 2 illustrate a spray rig 10 including a base 14, a motor 18 mounted to the base 14, a supply tube 22, and a spray head 26 mounted to the motor 18 and coupled to the supply tube 22. The spray rig 10 is operable to apply a material to a pipe 30 to line an interior surface 34 of the pipe 30 with the material. In one embodiment, the material is a geopolymer material that increases the strength and durability of the pipe 30 when applied to the pipe 30, as will be described in more detail below. In other embodiments, the material may be another type of material.

The base 14 includes a housing 38, a plurality of ground engaging element 42, and a control panel 46. The base 14 is movable over the interior surface 34 of the pipe 30. The plurality of ground engaging elements 42 is attached to the housing 38 and engage the interior surface 34 of the pipe 30 to enable the base 14 to move over the interior surface 34 of the pipe 30. In the illustrated embodiment, the ground engaging elements 42 are wheels. In other embodiments, the ground engaging elements 42 may be another type of element for engaging the ground, such as a skid shoe. In some embodiments, a prime mover, such as a motor, may be disposed within the housing 38 of the base 14 to drive rotation of the ground engaging elements 42. In other embodiments, a prime mover may be provided external to the spray rig 10 for pushing and/or pulling the spray rig 10 over the interior surface 34 of the pipe 30. The control panel 46 extends from the housing 38 of the base 14 and controls movement of the base 14 and operation of the spray head 26. For example, in some embodiments, the control panel 46 may be configured to control the prime mover to control movement of the base 14.

Figure 1B:
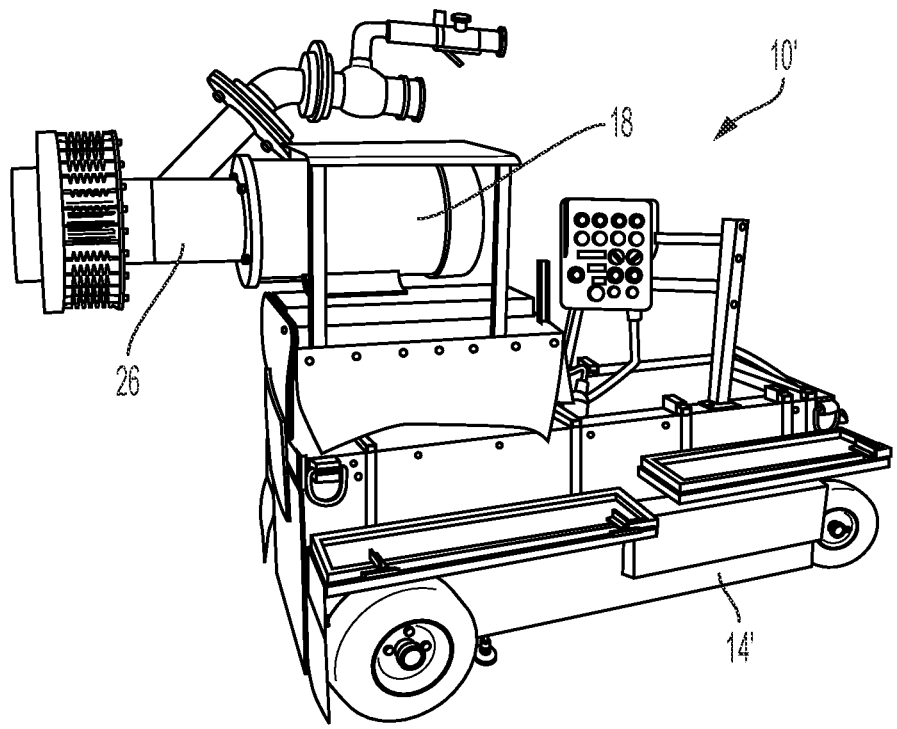
FIG. 1B is a perspective view of an alternative embodiment of a spray rig.

In other embodiments of a spray rig 10', as illustrated in FIG. 1B, the spray rig 10' may include a different base 14' that is different in size from the base 14 illustrated in FIG. 1A. The spray rig 10' includes the same sized motor 18 and spray head 26. In the illustrated embodiment of FIG. 1B, the base 14' is smaller than the base 14 of FIG. 1A. A relatively smaller base 14' may be desirable for applications of the spray rig 10' with relatively smaller or larger work surfaces (e.g., internal surface of a pipe). For example, the spray rig 10' may be used in applications in which a pipe is sized such that the base 14 of FIG. 1A is too large to enter the pipe. In such applications, the motor 18 and the spray head 26 are mounted to the smaller base 14' to enable use of the spray rig 10' with the smaller pipe to apply geopolymer material to an interior surface of the smaller pipe.

Figure 3:
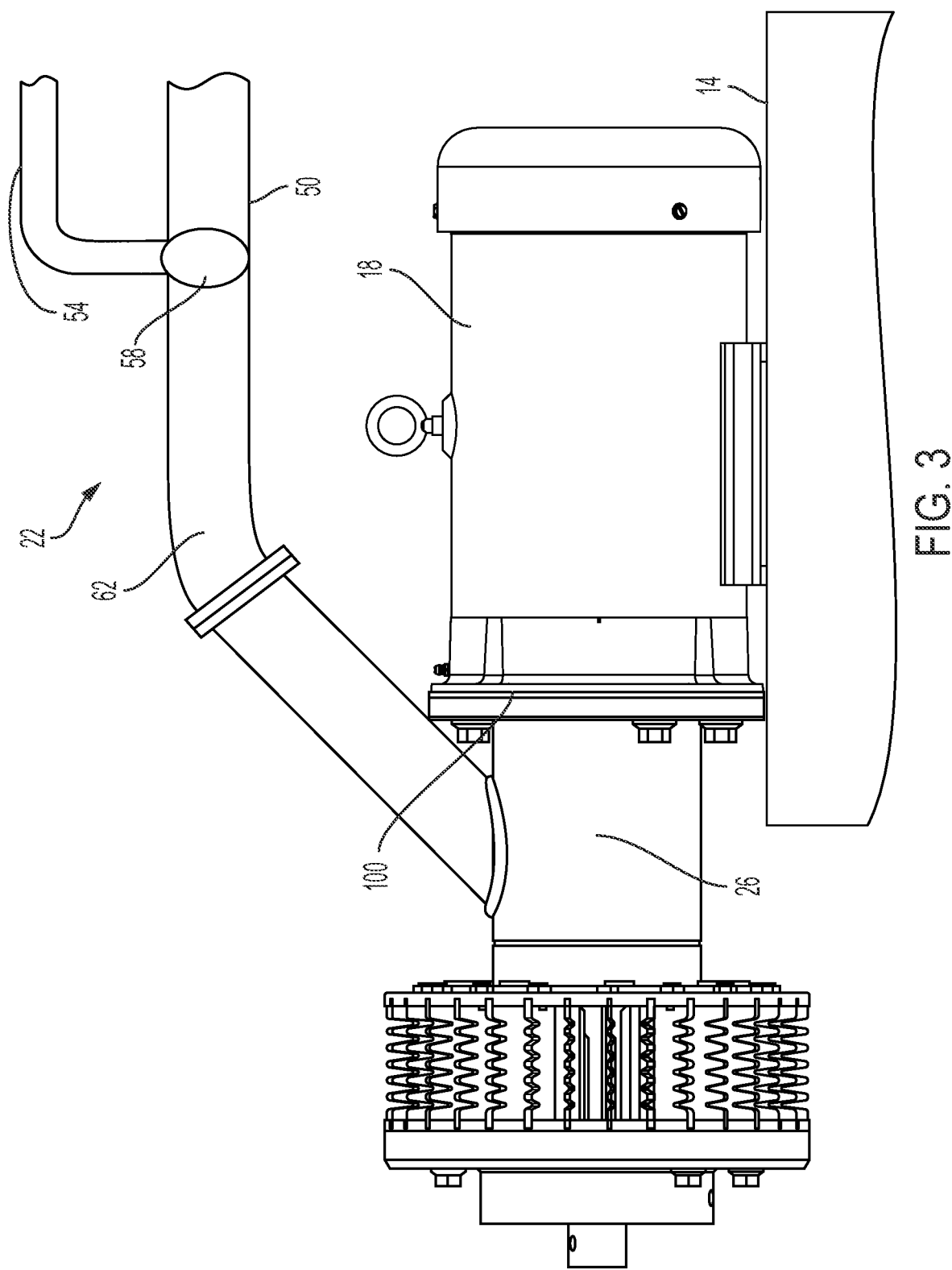
FIG. 3 is a side view of a portion of the base, the motor, the supply tube, and the spray head of FIG. 1A.
Figure 4:
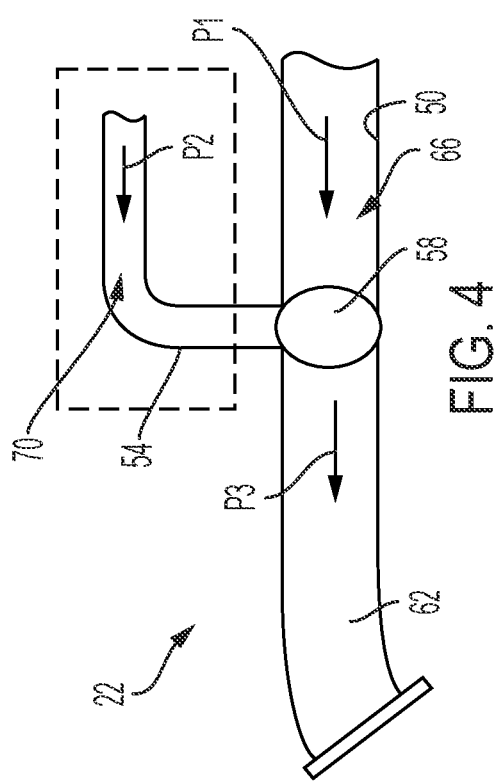
FIG. 4 is a schematic view of the supply tube of FIG. 3 including a first supply tube and a second supply tube.

As illustrated in FIGS. 3 and 4, the supply tube 22 includes a first supply tube 50, a second supply tube 54, a tube joint 58, and an outlet tube portion 62. The first supply tube 50 and the second supply tube 54 intersect at the tube joint 58. The first supply tube 50 defines a first conduit 66 in fluid communication with a supply source of a cementitious rehabilitating material, and the second supply tube 54 defines a second conduit 70 in fluid communication with a supply source of a quick setting additive. As such, the first supply tube 50 delivers the cementitious rehabilitating material to the tube joint 58, and the second supply tube 54 delivers the quick setting additive to the tube joint 58. The first supply tube 50 defines a first flow path P1 for the cementitious rehabilitating material to reach the tube joint 58, and the second supply tube 54 defines a second flow path P2 for the quick setting additive to reach the tube joint 58. The outlet tube portion 62 defines a third flow path P3 for the cementitious rehabilitating material and the quick setting additive to flow together from the tube joint 58 through the outlet tube portion 62.

In some embodiments, the tube joint 58 may include a valve, such as a mixing valve. The valve may be user-operable to control the flow of the cementitious rehabilitating material through the first supply tube 50, the flow of the quick setting additive through the second supply tube 54, or both. As such, in embodiments in which the tube joint 58 includes a valve, the tube joint 58 may enable a user to actively adjust the concentration of the cementitious rehabilitating material and the quick setting additive flowing to the spray head 26.

Figure 5B:
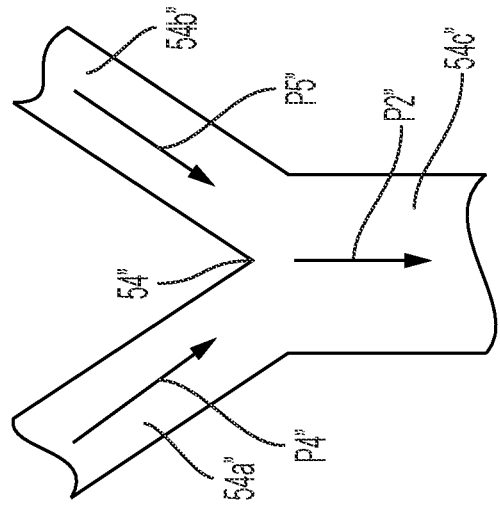
FIG. 5B is an enlarged view of an alternative embodiment of a second supply tube.
Figure 5A:
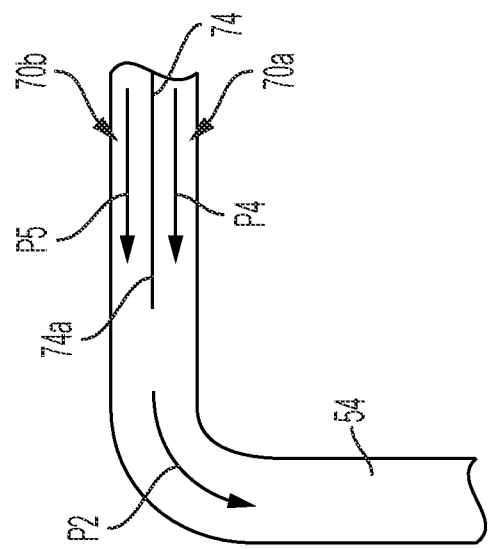
FIG. 5A is an enlarged view of the second supply tube of FIG. 4.

In the illustrated embodiment, with reference to FIGS. 4 and 5A, the second supply tube 54 includes a dividing wall 74 disposed within the second conduit 70. The dividing wall 74 splits, or divides, the second conduit 70 into a first portion 70a and a second portion 70b. The first portion 70a is configured to deliver a gas, and the second portion 70b is configured to deliver the quick setting additive. More specifically, the first portion 70a is configured to deliver pressurized air. The first portion 70a defines a fourth flow path P4 for the pressurized air to reach the tube joint 58, and the second portion 70b defines a fifth flow path P5 for the quick setting additive to reach the tube joint 58. The dividing wall 74 separates the first and the second portion 70a, 70b such that the pressurized air and the quick setting additive do not interact with each other where the dividing wall 74 is present. After the pressurized air and the second material reach an end 74a of the dividing wall 74, the air interacts, and in some instances, joins, with the quick setting additive material prior to reaching the tube joint 58.

In other embodiments of a second supply tube 54", as illustrated in FIG. 5B, the second supply tube 54" may not include the dividing wall 74 of FIG. 5A. Rather, the second supply tube 54" includes a first segment 54a", a second segment 54b", and a third segment 54c". Each of the segments 54a", 54b", 54c" is oriented such that the second supply tube 54" is Y-shaped. Specifically, the first segment 54a" and the second segment 54b" branch away from each other at symmetric angles relative to the third segment 54c". The first segment 54a" defines a fourth flow path P4" for pressurized air to flow to third segment 54c", the second segment 54b" defines a fifth flow path P5" for the quick setting additive to flow to the third segment 54c", and the third segment 54c" defines a second flow path P2" for the air and the quick setting additive to flow together to the tube joint 58 of FIG. 4. In other embodiments, the second supply tube 54, 54" may be formed in other shapes that define separate flow paths P4, P4", P5, P5" for the pressurized air and the quick setting additive.

Figure 6:
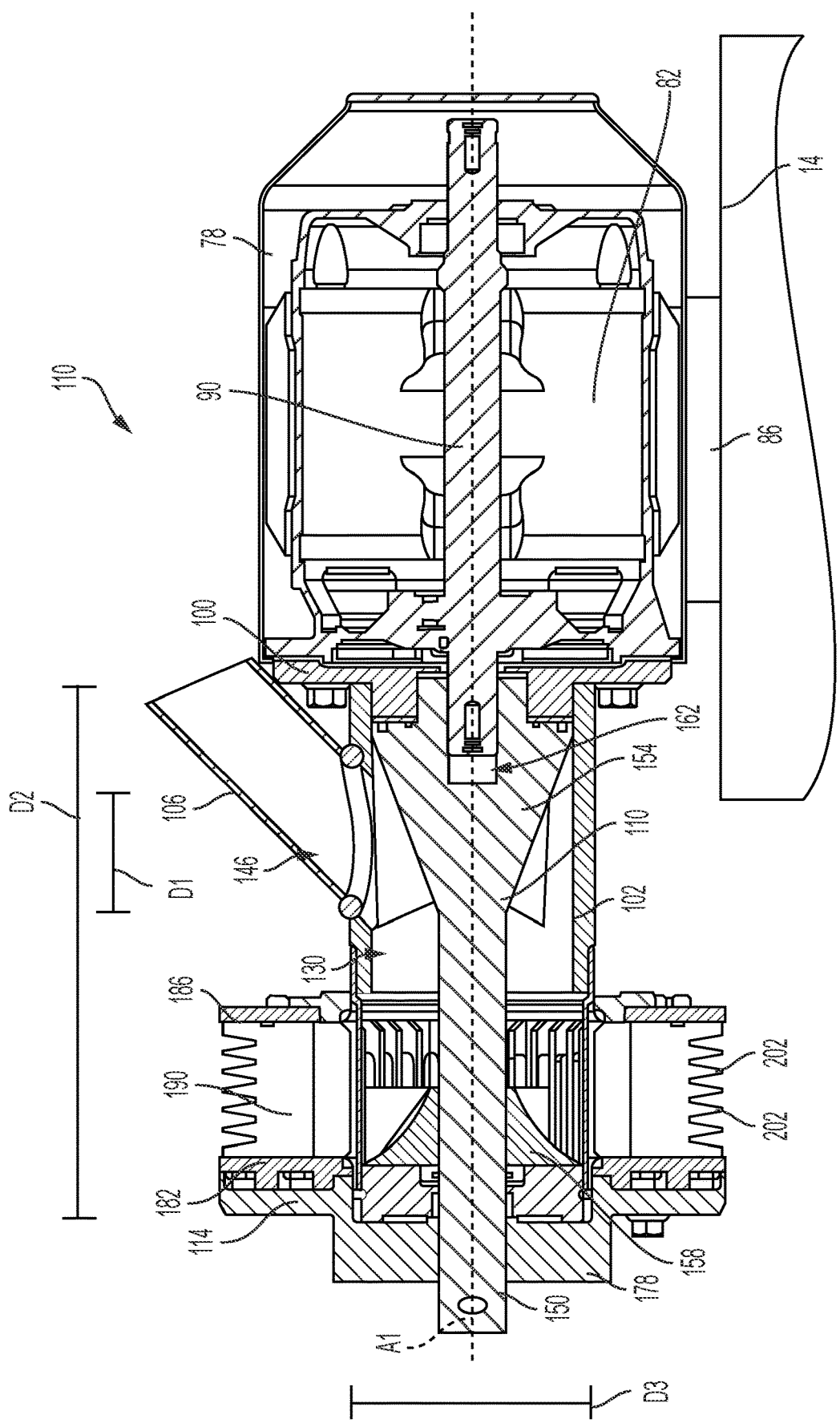
FIG. 6 is a cross-sectional view of the spray head taken along a center of the spray rig.
Figure 7:
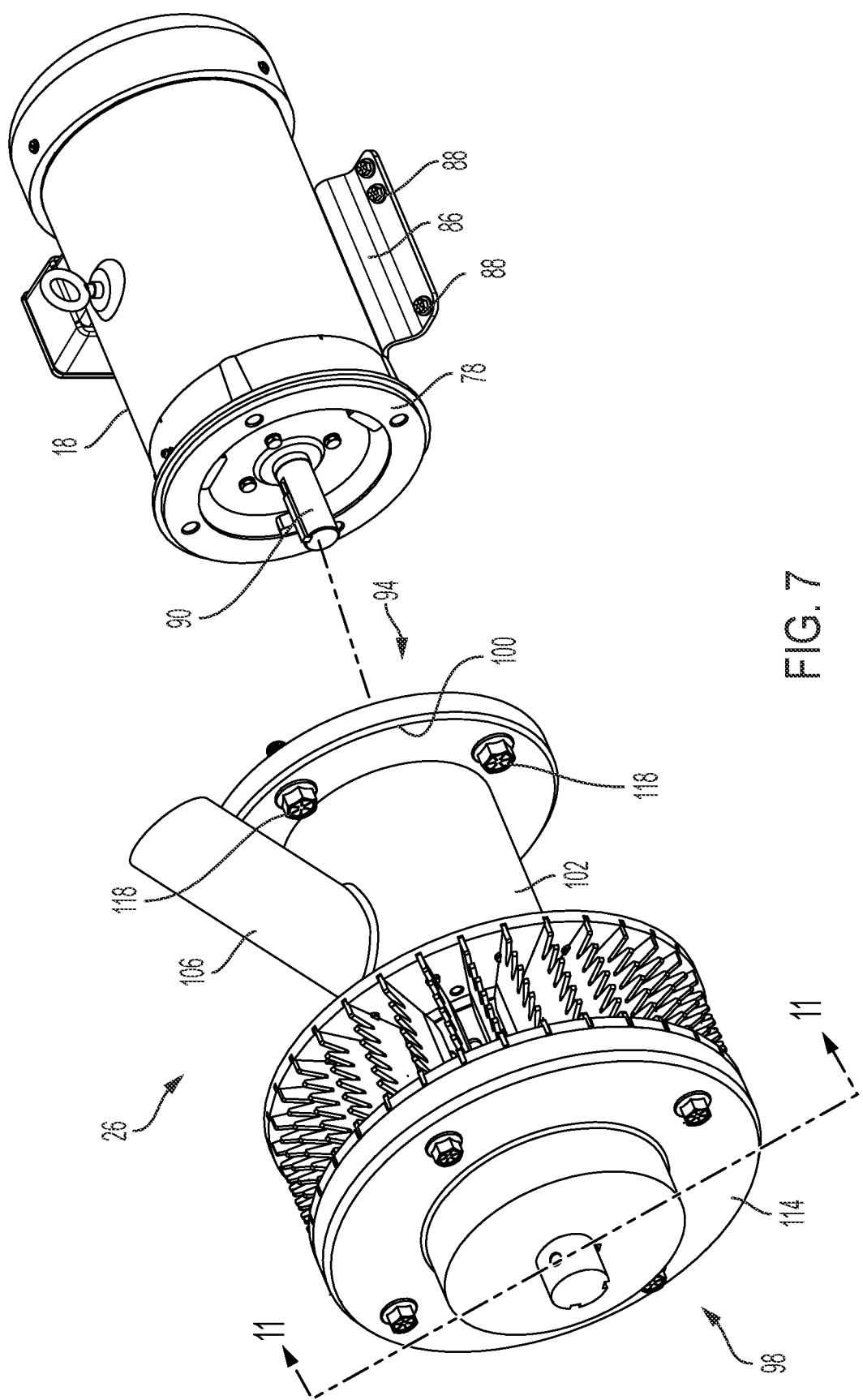
FIG. 7 is a partial exploded view of the spray head and the motor of FIG. 1A.

As illustrated in FIGS. 6 and 7, the motor 18 is mounted to the base 14 opposite from the ground engaging elements 42 of FIG. 1A. The motor 18 includes a motor housing 78 and a motor unit 82 disposed within the motor housing 78. In the illustrated embodiment, the motor housing 78 includes motor support stands 86 that mount to the base 14. Specifically, the motor support stands 86 receive fasteners 88 to mount the motor 18 to the base 14. As such, the fasteners 88 may be removed from the motor support stands 86 to enable removal of the motor 18 from the base 14. In other words, the motor 18 is removably mounted to the base 14. By removing the motor 18 from the base 14, a user may mount the motor 18 to another base, such as the base 14' of FIG. 1B. The motor unit 82 includes a motor shaft 90 that provides a rotational output for the motor 18 when the motor 18 is actuated.

Figure 8:
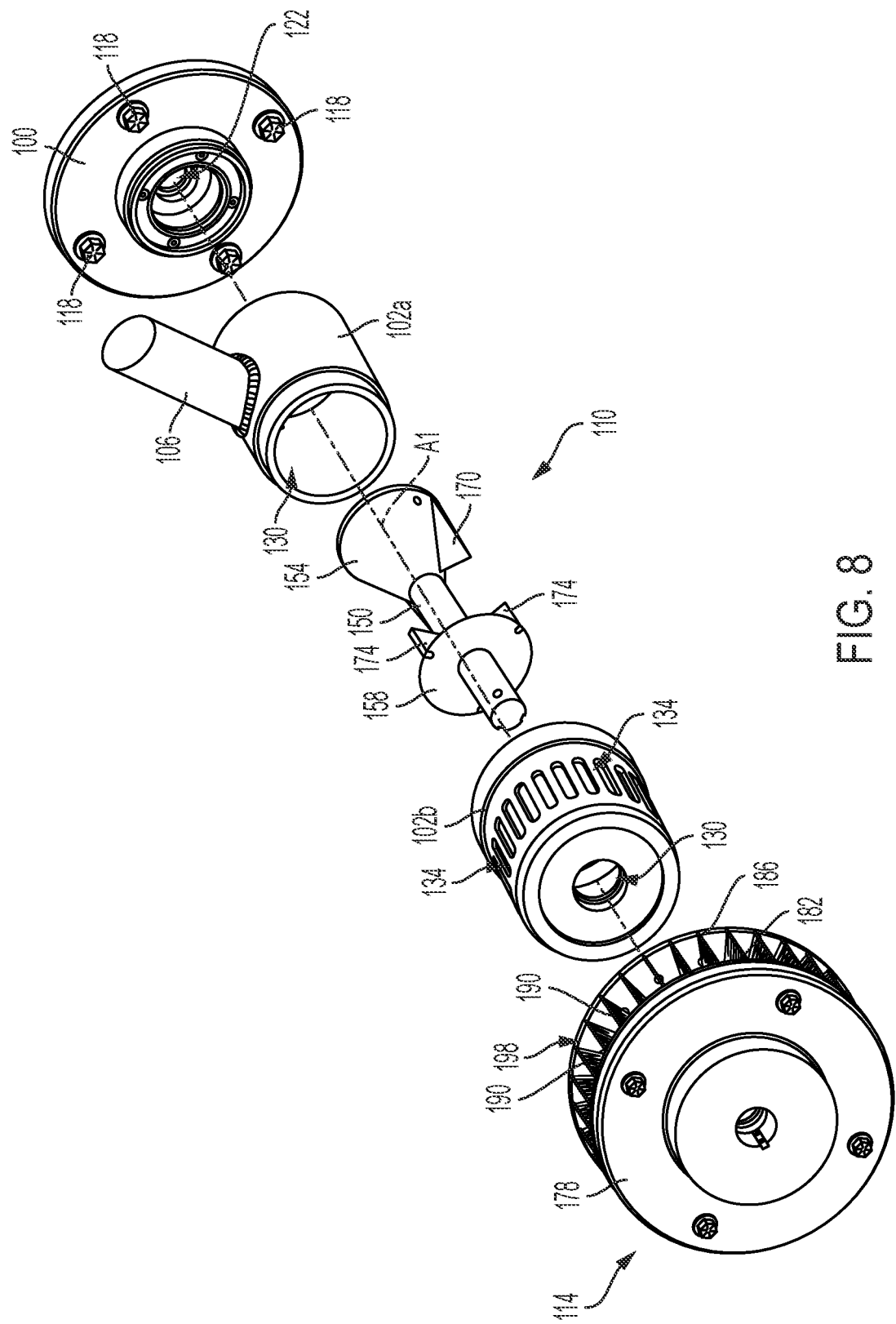
FIG. 8 is an exploded view of the spray head of FIG. 7 including a mating component, a mixing chamber, a feed tube, an agitator, and a spray deflector.

As illustrated in FIGS. 6-8, the spray head 26 includes a first end 94 and a second end 98 opposite from the first end 94. The spray head 26 further includes a mating component 100 located adjacent to the first end 94, a mixing chamber 102 that extends from the mating component 100, and a spray deflector 114 located adjacent to the second end 98. In the illustrated embodiment, the mating component 100 is located at the first end 94 of the spray head 26, and the spray deflector 114 is located at the second end 98 of the spray head 26. The mating component 100 removably couples the spray head 26 to the motor 18. In the illustrated embodiment, the mating component 100 directly couples to the motor 18. In other embodiments, the mating component 100 may directly couple to the base 14 such that the mating component 100 is indirectly coupled to the motor 18. The mixing chamber 102 extends from the mating component 100 and away from the motor 18 when the spray rig 10 is assembled (as illustrated in FIG. 3). The spray head 26 further includes a feed tube 106, an agitator 110, and an agitator axis A1. The feed tube 106 extends from the mixing chamber 102 between the mating component 100 and the spray deflector 114. The agitator 110 is disposed within the mixing chamber 102.

As illustrated in FIG. 7, the mating component 100 receives fasteners 118 to removably couple the spray head 26 to the motor 18. Specifically, the mating component 100 receives fasteners 118 to removably couple the spray head 26 to the motor housing 78 such that the mating component 100 is rotationally fixed relative to the motor housing 78. In other embodiments, the mating component 100 may be coupled to the motor 18 with another means, such as welding, so that the spray head 26 is not removable from the motor 18. In the illustrated embodiment, the mating component 100 is a flange. In other embodiments, the mating component 100 may be another structure configured for attachment to the motor 18, such as an end cap, a washer, and the like. The mating component 100 removably couples the spray head 26 to the motor 18 such that the spray head 26 is removable from the base 14 independently from the motor 18 and together with the motor 18.

Figure 9:
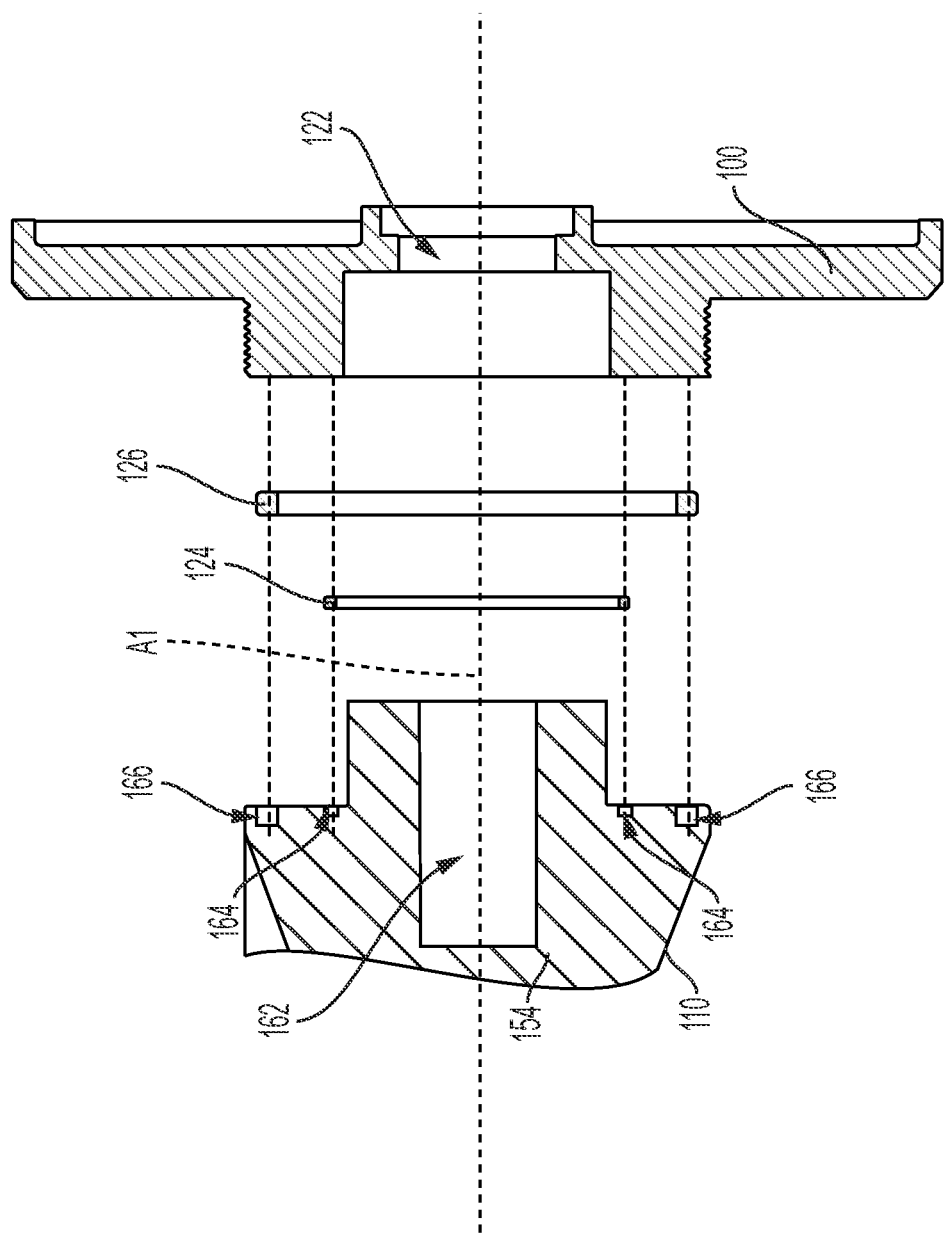
FIG. 9 is a cross-sectional exploded view of the mating component and the agitator of FIG. 8

With reference to FIGS. 7 and 9, the mating component 100 includes an aperture 122, a first seal 124, and a second seal 126. The aperture 122 is centrally located through the mating component 100 and is configured to receive the motor shaft 90 such that the motor shaft 90 extends into the mixing chamber 102 when the spray head 26 is coupled to the motor 18. Each of the first seal 124 and the second seal 126 is ring-shaped and is positioned outward of the aperture 122. The second seal 126 is positioned outward of the first seal 124. In other words, the first seal 124 is positioned within an inner diameter of the second seal 126, and the aperture 122 is located within an inner diameter of the first seal 124. Each of the first seal 124 and the second seal 126 engages the agitator 110 to inhibit fluid flow between the spray head 26 and the motor 18.

Returning reference to FIGS. 6 and 7, in the illustrated embodiment, the mixing chamber 102 threadedly couples to the mating component 100 and extends away from the motor 18 when coupled to the mating component 100. In some embodiments, the mixing chamber 102 may be integrally formed with the mating component 100. The mixing chamber 102 defines, or includes, an internal cavity 130 and, as best illustrated in FIG. 8, a plurality of slots 134 defined in, or formed on, an outer surface of the mixing chamber 102. The plurality of slots 134 is in fluid communication with the internal cavity 130 and is disposed adjacent to an end of the mixing chamber 102 that is opposite from the mating component 100. In the illustrated embodiment, the mixing chamber 102 is cylindrical. As such, the slots 134 are disposed uniformly around the mixing chamber 102. In other embodiments, the mixing chamber 102 may be formed in a different shape. For example, the mixing chamber 102 may be a rectangular prism.

In the illustrated embodiment, with reference to FIG. 8, the mixing chamber 102 includes a first sub-chamber 102a and a second sub-chamber 102b that is removably coupled to the first sub-chamber 102a. The first sub-chamber 102a extends from the mating component 100, and the second sub-chamber 102b is coupled to the first sub-chamber 102a at an end of the first sub-chamber 102a that is opposite from the mating component 100. As such, the slots 134 are defined in, or formed on, the second sub-chamber 102b. In the illustrated embodiment, the first sub-chamber 102a and the second sub-chamber 102b are threadedly coupled together. In other embodiments, the mixing chamber 102 may not include sub-chambers 102a, 102b such that the mixing chamber 102 is formed as a unitary body.

With reference to FIG. 6, the feed tube 106 extends from the mixing chamber 102 such that the feed tube 106 is in fluid communication with the internal cavity 130 of the mixing chamber 102. The feed tube 106 defines an entryway 146 to the internal cavity 130 and is couplable to the supply tube 22 (as illustrated in FIG. 3) such that the feed tube 106 is configured to deliver the cementitious rehabilitating material and the quick setting additive to the internal cavity 130. In the illustrated embodiment, the feed tube 106 extends at an angle relative to the outer surface of the mixing chamber 102. Stated another way, the feed tube 106 extends from mixing chamber 102 transverse to the agitator axis A1 such that the feed tube 106 delivers material to the internal cavity 130 at an angle transverse to the agitator axis A1. In the illustrated embodiment, the entryway 146 has a major dimension D1 that is less than 10 inches. Specifically, the major dimension D1 of the entryway 146 is 6 inches. In other embodiments, the major dimension D1 may be between 1 and 25 inches. As such, the major dimension D1 is smaller than each of a length D2 and a width D3 of the mixing chamber 102. In the illustrated embodiment, the width D3 is the diameter of the mixing chamber 102

Figure 10:
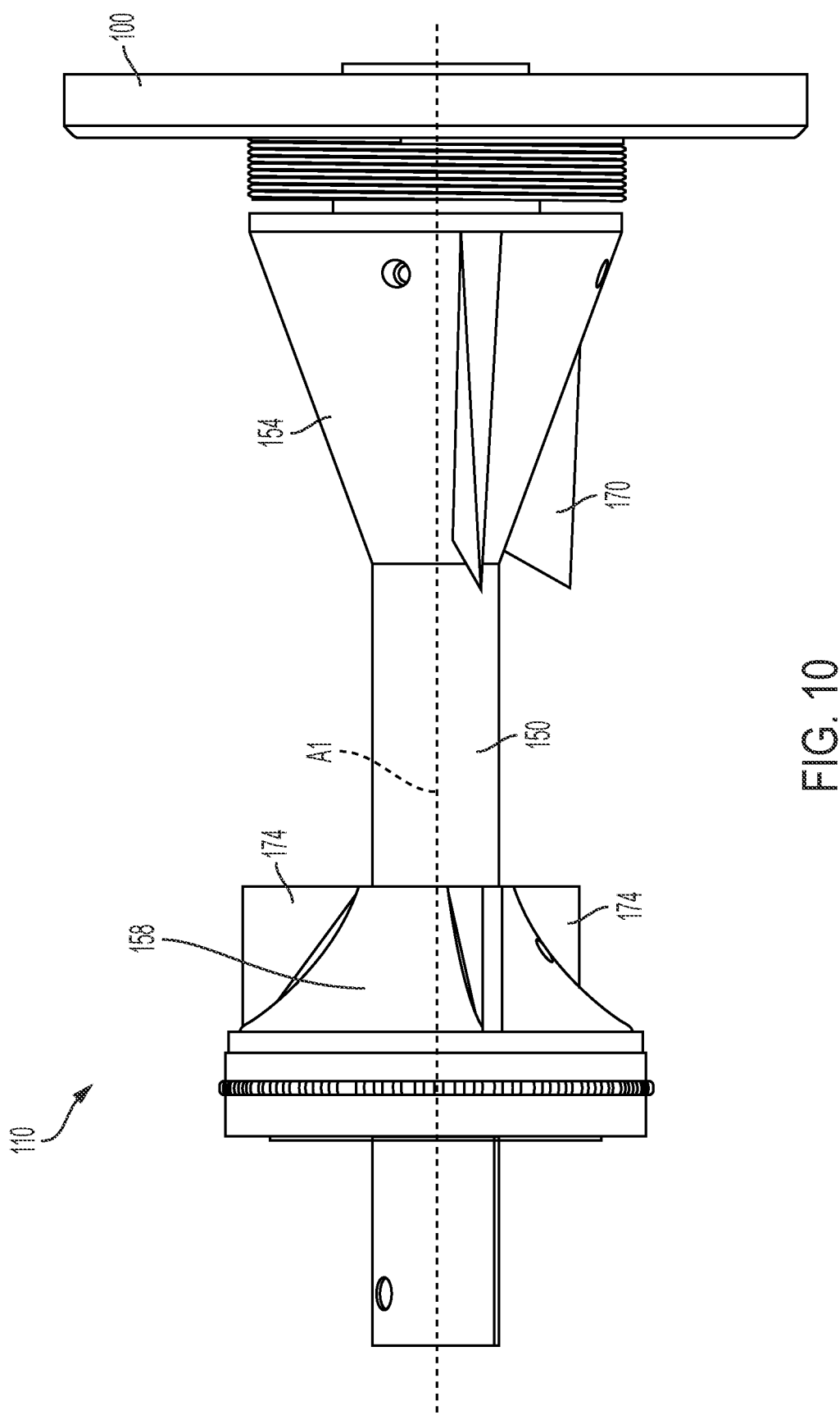
FIG. 10 is a side view of the agitator of FIG. 8.

As illustrated in FIGS. 8-10, the agitator 110 includes an agitator shaft 150, a first agitating cone 154, and a second agitating cone 158. When the spray head 26 is assembled, the first agitating cone 154 is positioned adjacent to the mating component 100 of the mixing chamber 102. In the illustrated embodiment, the first agitating cone 154 is integrally formed with the agitator shaft 150. With reference to FIGS. 6 and 9, the first agitator cone 154 defines a motor shaft receptacle 162, a first seal receptacle 164, and a second seal receptacle 166. The motor shaft receptacle 162 and the seal receptacles 164, 166 face the mating component 100. The motor shaft receptacle 162 receives the motor shaft 90 when the spray head 26 is coupled to the motor 18 such that the motor 18 is operable to rotate the agitator 110 about the agitator axis A1. Each of the first seal receptacle 164 and the second seal receptacle 166 is substantially ring-shaped and is planarly aligned with at least a portion of the motor shaft receptacle 162. In the illustrated embodiment, the motor shaft receptacle 162, and more specifically, the agitator axis A1, are located at the center of each of the first seal receptacle 164 and the second seal receptacle 166. When the spray head 26 is assembled, the first seal receptacle 164 receives the first seal 124 from the mating component 100 and the second seal receptacle 166 receives the second seal 126 from the mating component 100 such that each of the first seal 124 and the second seal 126 is compressed between the agitator 110 and the mating component 100 to inhibit fluid (e.g., the geopolymer material) from flowing from the mixing chamber 102 to the motor 18.

With reference to FIGS. 6 and 10, the second agitating cone 158 is disposed on the agitator shaft 150 a distance from the first agitating cone 154. As such, the first agitating cone 154 is positioned between the mating component 100 and the second agitating cone 158. In the illustrated embodiment, the second agitating cone 158 is formed separately from the agitator shaft 150 and the first agitating cone 154. The second agitating cone 158 is secured in position along the agitator shaft 150 by a fastener such that the second agitating cone 158 is coupled to the agitator shaft 150 for rotation with the agitator shaft 150 and the first agitating cone 154 about the agitator axis A1. The first agitating cone 154 includes a plurality of first agitator vanes 170, and the second agitating cone 158 includes a plurality of second agitator vanes 174. In the illustrated embodiment, the plurality of first agitator vanes 170 extends parallel to the agitator axis A1, and the plurality of second agitator vanes 174 extend parallel to the agitator axis A1.

Figure 11:
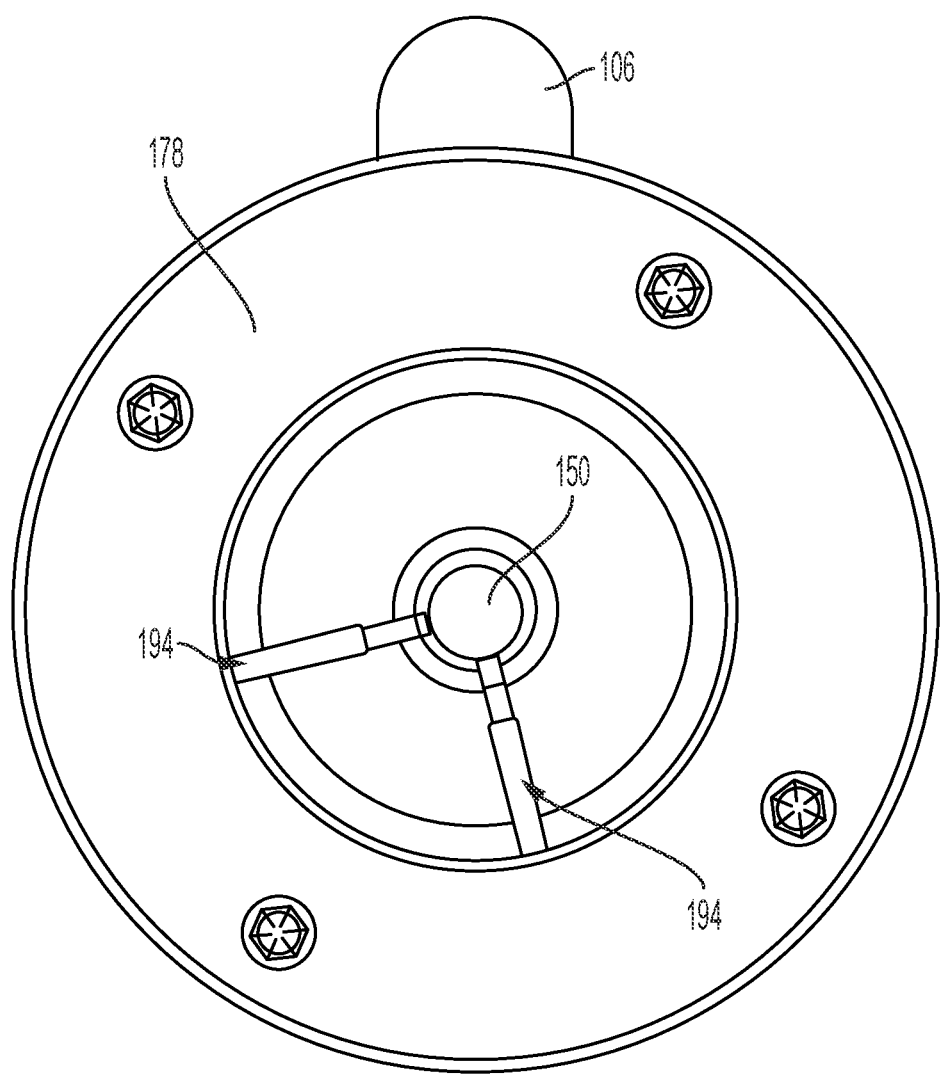
FIG. 11 is a cross-sectional view of the spray head of FIG. 7 taken along line 11-11.

With reference to FIGS. 6 and 8, the spray deflector 114 includes an end cap 178, a first deflector flange 182, a second deflector flange 186, and a plurality of deflectors 190. The end cap 178 is coupled to the agitator shaft 150 for rotation with the agitator 110 as the agitator 110 is driven by the motor 18. More specifically, the end cap 178 is coupled to the agitator shaft 150 at a location on the agitator shaft 150 that extends exterior to, or past, the mixing chamber 102. As illustrated in FIG. 11, the end cap 178 defines bores 194 that receive corresponding fasteners, such as, but not limited to, the fasteners 88 of FIG. 7, to couple the end cap 178 to the agitator shaft 150. As such, the agitator shaft 150 is configured to at least partially transfer rotation to the end cap 178 through the fasteners. Returning reference to FIGS. 6 and 8, the first deflector flange 182 is coupled to the end cap 178 for rotation with the end cap 178. The second deflector flange 186 is positioned between the first deflector flange 182 and the mating component 100 such that a deflector gap 198 is defined between the first deflector flange 182 and the second deflector flange 186. The plurality of deflectors 190 extends through the deflector gap 198 between the first deflector flange 182 and the second deflector flange 186 such that the plurality of deflectors 190 couples the first deflector flange 182 to the second deflector flange 186. As such, the second deflector flange 186 and the plurality of deflectors 190 are coupled for rotation with the end cap 178 and the agitator 110.

In the illustrated embodiment, the first deflector flange 182 and the second deflector flange 186 are positioned such that the deflector gap 198 is in alignment with, or overlaps, at least a portion of the plurality of slots 134. As such, the plurality of deflectors 190 is in alignment with, or overlaps, at least a portion of the plurality of slots 134. The plurality of deflectors 190 extends parallel to an extension direction of the plurality of slots 134. In the illustrated embodiment, the deflectors 190 are disposed uniformly around the agitator axis A1 such that the plurality of deflectors 190 divides the deflector gap 198 into a plurality of deflector gap channels. Each of the plurality of deflectors 190 includes a plurality of finger protrusions 202 on an end of each of the plurality of deflectors 190 that faces away from the plurality of slots 134. The plurality of finger protrusions 202 aid in redirecting a spray direction of material that is sprayed from the mixing chamber 102, as will be described in more detail below. In other embodiments, the plurality of deflectors 190 may have a different shape such that the spray pattern for the spray head 26 is adjusted.

In operation of the spray rig 10, with reference to FIGS. 2 and 3, a user couples the supply tube 22 to the feed tube 106 (FIG. 6) of the spray head 26 to begin delivering the cementitious rehabilitating material and the quick setting additive to the mixing chamber 102. A user may then operate the control panel 46 to move the spray rig 10 into the pipe 30. Specifically, a user may operate the control panel 46 to actuate the prime mover so that the spray rig 10 moves over the interior surface 34 of the pipe 30. In some embodiments, the user may manually push and/or pull the spray rig 10 over the interior surface 34 of the pipe 30. In other embodiments, the base 14 of the spray rig 10 may be coupled to an external mover for pushing and/or pulling the spray rig 10 over the interior surface 34 of the pipe 30.

With reference to FIGS. 2 and 8, after the spray rig 10 has entered the pipe 30 and as the cementitious rehabilitating material and the quick setting additive is delivered to the mixing chamber 102, a user may operate the control panel 46 to actuate the motor 18 such that the motor 18 drives rotation of the agitator 110. As the agitator 110 rotates and the cementitious rehabilitating material and the quick setting additive are delivered into the mixing chamber 102 through the entryway 146 (FIG. 6), the plurality of first agitator vanes 170 and the plurality of second agitator vanes 174 rotate about the agitator axis A1 to mix the cementitious rehabilitating material and the quick setting additive together to form the geopolymer material. Further, as the plurality of first agitator vanes 170 and the plurality of second agitator vanes 174 rotate about the agitator axis A1, the vanes 170, 174 induce an outward movement of the geopolymer material such that the geopolymer material rotates around an inner surface of the mixing chamber 102. Geopolymer material located within the second sub-chamber 102b of the mixing chamber 102 may rotate around the inner surface of mixing chamber 102 such that the geopolymer material is directed through the plurality of slots 134 and into the deflector gap 198.

As the motor 18 drives rotation of the agitator 110, the agitator 110 transfers rotational motion to the spray deflector 114 such that the plurality of deflectors 190 rotate around the agitator axis A1. Therefore, as the geopolymer material enters the deflector gap 198, the plurality of deflectors 190 is configured to engage the geopolymer material to alter the direction and speed with which the geopolymer material is sprayed from the spray head 26. As such, the spray head 26 may spray, or direct, the geopolymer material around the agitator axis A1 from the mixing chamber 102 and onto the interior surface 34 of the pipe 30 as the base 14 moves over the interior surface 34 of the pipe 30.

The spray rig 10 advantageously enables a user to spray at least 2 inches of the geopolymer material onto the interior surface 34 of the pipe 30 at a time. That is, at a single axial location of the pipe 30, the spray rig 10 is capable of lining the interior surface 34 of the pipe 30 with 2 inches of the geopolymer material. Previous spray rigs are incapable of spraying 2 inches of geopolymer material onto pipe surfaces. As such, the spray rig 10 enables a user to repair, or mend, pipe surfaces to be relatively stronger and more durable than previous spray rigs.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof.

Various features and advantages of the invention are set forth in the following claims.

The invention claimed is:

1. A spray rig for applying a material to a pipe to line an interior surface of the pipe with the material, the spray rig comprising:
   a base configured to move over an interior surface of the pipe;
   a motor mounted to the base for movement with the base along the interior surface of the pipe; and
   a spray head including
      a first end,
      a second end opposite the first end, a mating component adjacent the first end of the spray head and the mating component removably couples the spray head to the motor,
a mixing chamber that extends from the mating component and the mixing chamber includes an internal cavity and a plurality of slots in fluid communication with the internal cavity,
a feed tube that extends from the mixing chamber and is in fluid communication with the internal cavity, the feed tube configured to deliver the material to the internal cavity,
an agitator in the mixing chamber, the agitator coupled to the motor and the motor operable to rotate the agitator about an agitator axis to mix the material in the mixing chamber and to direct the material through the plurality of slots, and
a spray deflector adjacent the second end of the spray head, the spray deflector coupled to the agitator for rotation with the agitator by the motor, the spray deflector configured to redirect the material from the mixing chamber and onto the interior surface of the pipe.

2. The spray rig of claim 1, wherein the feed tube extends from the mixing chamber between the mating component and the spray deflector and wherein the feed tube defines an entryway to the internal cavity of the mixing chamber.

3. The spray rig of claim 1, wherein the feed tube extends transverse to the agitator axis such that the feed tube delivers the material to the internal cavity at an angle transverse to the agitator axis.

4. The spray rig of claim 1, wherein the feed tube defines an entryway to the internal cavity of the mixing chamber, and wherein the entryway has a major dimension that is smaller than each of a length and a width of the mixing chamber.

5. The spray rig of claim 1, wherein the agitator includes an agitator cone having a plurality of agitator vanes that extend parallel to the agitator axis, and wherein the motor is operable to rotate the agitator such that the plurality of agitator vanes rotates about the agitator axis to mix the material in the mixing chamber.

6. The spray rig of claim 5, wherein the agitator cone defines a ring-shaped slot, and wherein the spray head further includes a ring-shaped seal positioned in the ring-shaped slot such that the ring-shaped seal is compressed between the agitator and the mating component to inhibit the material from flowing from the mixing chamber to the motor.

7. The spray rig of claim 5, wherein the agitator cone is a first agitator cone and the plurality of agitator vanes is a plurality of first agitator vanes, the agitator further including a second agitator cone having a plurality of second agitator vanes extending parallel to the agitator axis, and wherein the second agitator cone is disposed within the mixing chamber, and wherein the motor is operable to rotate the agitator such that the plurality of second agitator vanes rotates about the agitator axis to direct the material through the plurality of slots.

8. The spray rig of claim 1, wherein the mating component is rotationally fixed relative to the motor such that the mixing chamber is rotationally fixed relative to the motor and the motor is operable to drive rotation of the agitator and the spray deflector relative to the mating component and the mixing chamber.

9. The spray rig of claim 8, wherein the spray deflector further includes
a first flange adjacent to the second end of the spray head,
a second flange positioned between the first flange and the mating component such that a deflector gap is defined between the first flange and the second flange, and
a plurality of deflectors extending through the deflector gap between the first flange and the second flange such that the plurality of deflectors extends parallel to an extension direction of the plurality of slots, the plurality of deflectors overlapping at least a portion of the plurality of slots.

10. The spray rig of claim 9, wherein each of the plurality of deflectors includes a plurality of finger protrusions on an end of each of the plurality of deflectors that faces away from the plurality of slots.

11. The spray rig of claim 1, wherein the motor includes a motor housing having a motor stand that mounts the motor to the base, the motor stand receiving a plurality of fasteners such that the stand removably mounts the motor housing to the base.

12. The spray rig of claim 1, wherein the motor is removably mounted to the base, and wherein the spray head is removable from the base independently from the motor and together with the motor.

13. The spray rig of claim 1, wherein the base is a first base, the motor being removable from the first base and mountable to a second base, wherein the second base has a different size than the first base such that the second base is movable over an internal surface of a different sized pipe, and wherein the motor and the spray head are operable with the second base to direct the material onto the internal surface of the different sized pipe.

14. The spray rig of claim 1, wherein the mixing chamber includes a first portion extending from the mating component and a second portion that is threadedly coupled to the first portion opposite from the mating component.

15. A method of applying a material to a pipe to line an interior surface of the pipe with the material, the method comprising:
providing a spray rig within the pipe, the spray rig including
a base configured to move over an interior surface of the pipe;
a motor mounted to the base for movement with the base along the interior surface of the pipe; and
a spray head including a mating component that removably couples the spray head to the motor, a mixing chamber extending from the mating component and including an internal cavity and a plurality of slots in fluid communication with the interior cavity, a feed tube that extends from the mixing chamber and is in fluid communication with the internal cavity, and an agitator coupled to the motor such that the motor is operable to rotate the agitator about an agitator axis;
supplying a cementitious rehabilitating material and a quick setting additive to the feed tube such that the cementitious rehabilitating material and the quick setting additive are delivered to the internal cavity of the mixing chamber through the feed tube; and
actuating the motor to drive rotation of the agitator for mixing the cementitious rehabilitating material and the quick setting additive to form the material within the mixing chamber such that the material is a mixture of the cementitious rehabilitating material and the quick setting additive;
wherein the spray head includes a spray deflector mounted for rotation with the agitator by the motor and a plurality of deflectors that overlap at least a portion of the plurality of slots, and wherein actuating the motor to drive rotation of the agitator drives rotation of the spray deflector such that the plurality of deflectors rotates about the agitator axis to redirect spray of the material; and spraying the material onto the interior surface of the pipe.

16. The method of claim 15, wherein supplying a cementitious rehabilitating material and a quick setting additive to the feed tube includes coupling a supply tube to the feed tube, the supply tube defining a first conduit providing a flow path for the cementitious rehabilitating material and a second conduit providing a flow path for the quick setting additive, wherein a portion of the first conduit and a portion of the second conduit are fluidly separate from each other, and wherein the first conduit and the second conduit are in fluid communication with each other at the location of the supply tube where the supply tube couples to the feed tube.

17. The method of claim 16, wherein supplying a cementitious rehabilitating material and a quick setting additive to the feed tube further includes supplying a flow of air in one of the first conduit and the second conduit such that the flow of air mixes with the cementitious rehabilitating material and the quick setting additive within the mixing chamber.

18. The method of claim 15, wherein the agitator includes a first agitator cone having a plurality of first vanes extending parallel to the agitator axis and a second agitator cone having a plurality of second vanes extending parallel to the agitator axis, and wherein actuating the motor to drive rotation of the agitator drives rotation the plurality of first vanes and the plurality of second vanes about the agitator axis of rotation to mix the cementitious rehabilitating material and the quick setting additive.

19. The method of claim 15, further comprising decoupling the motor and the spray head from the base after the material has been sprayed onto the interior surface of the pipe and coupling the motor and the spray head to a smaller base to apply the material to a smaller pipe to line an interior surface of the smaller pipe with the material.

* * * * *